United States Patent Office 3,288,752
Patented Nov. 29, 1966

3,288,752
PROCESS OF CURING 1,2-DIEPOXY MONOMERS
Louis A. Joo, Crystal Lake, Ill., assignor, by mesne assignments, to Union Oil Company of California, Los Angeles, Calif., a corporation of California
No Drawing. Filed Dec. 15, 1961, Ser. No. 159,765
18 Claims. (Cl. 260—47)

This invention relates to new and useful improvements in methods of curing epoxy resins and to improved, curable, epoxy resin compositions. More particularly, this invention is concerned with the use of compounds of the formula:

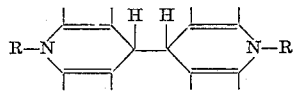

as curing agents for epoxy resins.

Epoxy resins have assumed increasing importance in the plastics industry during recent years because of high thermal and chemical stability at high tensile and impact strength. The simplest epoxide, ethylene oxide, has been known for more than 100 years. It has also been known for many years that ethylene oxide could be polymerized catalytically or by reaction with difunctional compounds to produce polymers of various types. Diepoxy compounds have been known for more than 60 years. The epoxy resins, however, are among the newest of the major industrial plastics. They were first synthesized by Castan in Switzerland and Greenlee in the United States in the late 1930's. In common with phenolic and polyester resins, the epoxy resins are thermosetting materials. When converted by a curing agent, the thermosetting epoxy resins become hard, infusible resins. The practical use of epoxy polymers came first with their application as adhesives during World War II. Since that time, the development of new epoxy resins and new uses for these resins has been gradual, although in recent years the use of epoxy resins has accelerated rapidly.

Epoxy resins are prepared from monomers having two or more reactive epoxide groups in the monomer structure. The epoxy monomers are available commercially, both in liquid and solid forms (the term "monomer" as used herein includes compositions which are strictly monomeric or which are only partially polymerized or contain small amounts of polymers), and are polymerized by addition of curing agents which include primary, secondary, and tertiary amines, and polyfunctional compounds such as glycols, polyglycols, polyamines, polyamides, and carboxylic acid anhydrides. The resins which are prepared by curing epoxy resin monomers are cross-linked resins of the thermosetting type and are characterized by high chemical and thermal stability at high tensile and impact strength.

One of the objects of this invention is to provide a new and improved process for curing epoxy resin compositions.

Another object of this invention is to provide an improved curable epoxy resin composition.

Another object of this invention is to provide an improved epoxy resin.

A feature of this invention is the provision of a process for curing epoxy resins by mixing with the epoxy monomer a small amount of a curing agent of the formula:

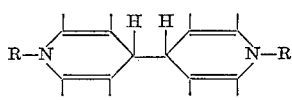

where

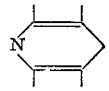

is derived from an aromatic heterocyclic amine and has the free valences satisfied by inert substituents, and R is selected from the group consisting of alkyl, alkenyl, and aryl radicals.

Another feature of this invention is the provision of an improved curable composition consisting essentially of an epoxy monomer having admixed therewith a small amount of a curing agent of the formula:

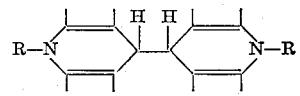

where

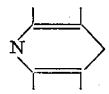

is derived from an aromatic heterocyclic amine and has the free valences satisfied by inert substituents, and R is selected from the group consisting of alkyl, alkenyl, and aryl radicals.

Still another feature of this invention is the provision of an improved epoxy resin produced by heating an epoxy monomer having admixed therewith a small amount of a curing agent of the formula:

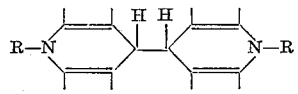

where

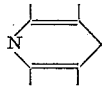

is derived from an aromatic heterocyclic amine and has the free valences satisfied by inert substituents, and R is selected from the group consisting of alkyl, alkenyl, and aryl radicals.

Other objects and features of this invention will become apparent from time to time throughout the specification and claims as hereinafter related.

In the copending patent application of Walter E. Kramer and Louis A. Joo, Serial No. 99,721, filed March 31, 1961, now Patent No. 3,168,503, there is disclosed a novel class of compounds of the formula:

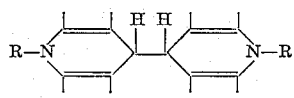

where

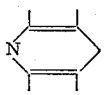

is derived from an aromatic heterocyclic amine and has the free valences satisfied by inert substituents, and R is an alkenyl radical. In that patent application it is disclosed that aromatic heterocyclic amines (e.g., pyridine, acridine, quinoline, and derivatives thereof containing only inert substituents), can be reacted with sodium or other alkali metals in solution to form a diamide of the formula:

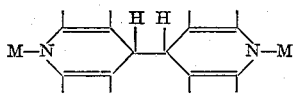

where

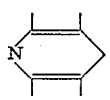

is derived from an aromatic heterocyclic amine and has the free valences satisfied by inert substituents, and M is an alkali metal.

This reaction has been described by Emmert et al., Ber., 54, 204–209 (1921). Emmert et al. also disclose the reaction of the disodium tetrahydrodipyridyl with alkyl halides to prepare difunctional tertiary amines of the formula,

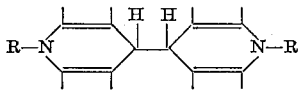

where

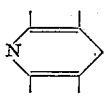

is derived from an aromatic heterocyclic amine and has the free valences satisfied by inert substituents, and R is an alkyl radical. Disodium, and tetrahydrodipyridyl (and analogs thereof) will react with alkenyl monohalides to form dialkenyl tetrahydrodipyridyls. The disodium tetrahydrodipyridyl (and analogs thereof) also will react with aryl halides to form the corresponding aryl amines.

This invention is based upon my discovery that compounds of the type described above, of the formula:

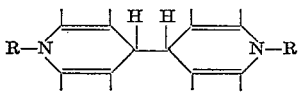

where

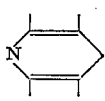

is derived from an aromatic heterocyclic amine and has the free valences satisfied by inert substituents, and R is selected from the group consisting of alkyl, alkenyl, and aryl radicals, are superior curing agents for epoxy resin monomers. This invention therefore comprises an improved process for curing epoxy resins by addition to epoxy resin monomers of a small amount of the aforementioned curing agent and for resin compositions containing a small amount of the curing agent. The curing agent is added to the epoxy resin in an amount which is effective for the particular resin to promote the hardening of the resin. The selection of the particular curing agent is determined by the characteristics of the epoxy resin composition, and the proportion of the curing agent may vary widely, although the use of about 5–20% wt. of the curing agent is preferred.

The epoxy resins which are admixed with the curing agent can be any of the many diepoxy compounds which are known to polymerize with heat (or by catalytic treatment) to form solid, relatively infusible resins. The most common epoxy monomer is the diglycidyl ether of bisphenol A. Bisphenol A is prepared by condensation of 2 mols of phenol with 1 mol of acetone. The bisphenol product is then reacted with epichlorohydrin in the presence of caustic to yield the diglycidyl ether in accordance with the equation:

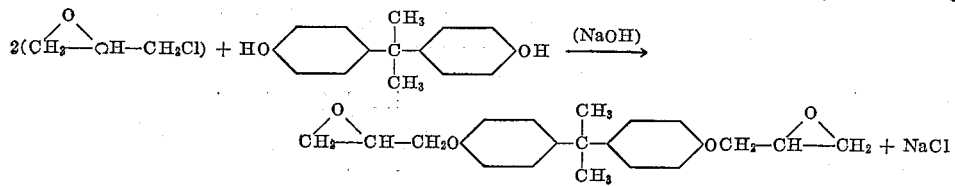

However, when the stoichiometric 2:1 ratio is employed, the yield of the monomeric diglycidyl ether is less than 10%, with the remaining material being higher-molecular-weight condensation and polymerization products. In order to obtain high yields of the monomeric product, excess epichlorohydrin is employed, the stoichiometric amount being doubled or tripled. It is then possible to obtain yields of 70% or more of the monomer. The epoxy "monomers" which are available commercially are generally mixtures containing varying amounts of the true monomer and other higher-molecular-weight condensation and polymerization products. The number of potentially useful reactants for the synthesis of epoxy resins is quite large. All varieties of polyhydric phenols, polyalcohols, polyfunctional halohydrins, and polyepoxides, have been suggested as intermediates in the literature. Many of these epoxy monomers which can be used in the preparation of epoxy resins are described in such text books as "Epoxy Resins," Skeist, Reinhold Publishing Corp., 1958, and "Epoxy Resins," Lee and Neville, McGraw-Hill Book Company, 1957. Compounds which are useful intermediates in the preparation of epoxy resins include diepoxides, such as butadiene diepoxide and divinylbenzene diepoxide, and diglycidyl ether,

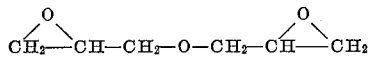

Other diglycidyl ethers include those produced by reaction of epichlorohydrin with other polyhydroxy compounds such as resorcinol, hydroquinone, pyrocatechol, saligenin, phloroglucinol, bisphenol F, trihydroxydiphenyldimethylmethane, 4,4'-dihydroxybiphenyl, long-chain bisphenols, 4,4'-dihydroxydiphenyl sulfone, novolac resins, ethylene glycol and higher glycols, glycerol, erythritol, pentaerythritol, etc., in the presence of alkali. Glycidyl esters are also known to be useful intermediates (resin monomers) in the preparation of epoxy resins. Such esters include the diglycidyl ester of diphenolic acid, diglycidyl esters of phthalic acids (all three isomers), and diglycidyl esters of aliphatic dibasic acids, e.g., succinic acid, sebacic acid, suberic acid, pimelic acid, etc. In the copending application of Walter E. Kramer and Louis A. Joo, Serial No. 58,638, filed September 27, 1960, now U.S. Patent 3,056,763, the diepoxy esters of 4,4'-tetrahydrodipyridyl dicarbamic acid (and analogs thereof) are disclosed as being novel epoxy resin monomers.

In carrying out this invention, a small amount, e.g., 5–20% wt., of the amine curing agent is added to the resin monomer (which can be any of the above-described epoxy resin monomers), and the mixture applied for its intended purpose and cured either by setting for an extended period at room temperature or by heating at 50–200° C. The resin composition which is thus prepared is characterized by a longer pot-life than other epoxy resin compositions and by superior hardness and impact strength after curing.

The following non-limiting examples are illustrative of the scope of this invention.

*Example I*

A series of experiments were carried out using Epon 828 (Shell Chemical Co.) as the epoxy resin monomer. Epon 828 is a liquid diglycidyl ether of disphenol A (containing a small portion of polymers and condensation products), having a viscosity of 135–195 poises and an epoxide equivalent of about 185–205 (grams of resin containing 1 gram equivalent of epoxide).

A mixture consisting of 10% pyridine in Epon 828 was prepared and placed in a test tube. A second mixture consisting of 10% piperidine in Epon 828 was prepared and placed in a test tube. A third mixture consisting of 10% diallyl tetrahydrodipyridyl,

was prepared and placed in a test tube in a similar manner. The three mixtures were kept at room temperature and were checked periodically to determine the extent to which gelling had occurred (this is standard procedure to determine pot-life at 25° C.). Complete gelling was considered to have taken place when the resin surface did not move in 5 minutes after the tube had been tilted 90°. The results of these experiments were as follows:

TABLE I

| Amine | Concentration (percent w.) | Pot life at 25° C. (Hours) |
| --- | --- | --- |
| Pyridine | 10 | 40 |
| Piperidine | 10 | 12 |
| Diallyltetrahydrodipyridyl | 10 | >80 |

*Example II*

In another series of experiments, portions of Epon 828, to which DADP (diallyltetrahydrodipyridyl), pyridine, or piperidine was added in various concentrations, were cured at 80° C., and the hardness of the resins was determined periodically. The resins were evaluated for Barcol hardness using a Barcol Impressor (manufactured by Barber-Collman Co.). The results were as follows:

TABLE II

| Amine | Concentration (percent w.) | Barcol Hardness after— | | |
| --- | --- | --- | --- | --- |
| | | 4 Hours | 6 Hours | 22 Hours |
| Pyridine | 8 | <30 | 39 | 54 |
| Do | 16 | 61 | 63 | 78 |
| Piperidine | 10 | 63 | 65 | 86 |
| DADP | 10 | 62 | 65 | 85 |

The four samples were then cured further by heating at 120° C. for an 8-hour period. At this time, the samples were tested for Barcol hardness and impact resistance. The results of these tests are set forth in Table III.

TABLE III

| Amine | Concentration (percent w.) | Barcol Hardness | Impact Resistance of 3/16" plate (inch-pounds) |
| --- | --- | --- | --- |
| Pyridine | 8 | 81 | 5 |
| Do | 16 | 82 | 10 |
| Piperidine | 10 | 86 | 7 |
| DADP | 10 | 87 | 10 |

*Example III*

In another series of experiments, portions of Epon 828, to which DADP, pyridine, or piperidine was added in 10% wt. concentration, were cured at 120° C. for various periods of time. The Barcol hardness of the cured resins was measured after periods of 1 hour, 3 hours, and 5 hours, respectively, and the impact resistance was measured at the end of the 5-hour period. The results of these measurements are set forth in Table IV.

TABLE IV

| Amine | Concentration (Percent w.) | Barcol Hardness after— | | | Impact Resistance of 3/16" plate (inch-pounds) |
| --- | --- | --- | --- | --- | --- |
| | | 1 hr. | 3 hrs. | 5 hrs. | |
| Pyridine | 10 | <25 | 69 | 79 | 1-2 |
| Piperidine | 10 | <25 | 81 | 84 | 4-5 |
| DADP | 10 | <25 | 81 | 85 | 5-6 |

From these experiments, I have found that the use of diallyl tetrahydrodipyridyl (and analogs thereof) as a curing agent for epoxy resins results in a resin composition having greatly enhanced pot life at room temperature, and having superior hardness and impact resistance after curing at elevated temperatures. These curing agents have the additional advantage that they have very high boiling points and permit the curing of epoxy resins at higher temperatures without loss of the curing agent. The high molecular weight of these curing compounds extends the pot life of the catalyzed resin mixture far longer than that of epoxy resins catalyzed with conventional curing agents, such as pyridine or piperidine.

From my experiments, I have found that dipyridyls and analogs thereof are especially useful as epoxy resin curing agents and have several advantages over conventional curing agents, such as pyridine or piperidine. By altering the length of the alkyl or alkenyl chains or size of the aromatic substituent, the compatibility of the curing agents with aromatic or aliphatic epoxides can be varied over a wide range. In the general formula,

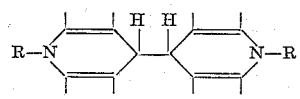

the aromatic nature of the molecule is dominant when R is short or when R is an aryl substituent. The compound is more compatible with aliphatic epoxides when R is a long-chain alkyl or alkenyl radical, or when the aromatic nucleus contains alkyl substituents. By using homologues of pyridine (e.g., picoline, 5-ethyl-2-methyl pyridine, lutidine, etc.), in the molecule, the aliphatic nature of the curing agent can be emphasized still further. By using quinoline, acridine, or derivatives thereof, instead of the pyridine nucleus, the aromatic nature of the curing agent can be made dominant. When R is an alkenyl radical, the double bonds can react with each other to provide an additional cross-linking and thus improve the physical strength of the cured resin. As previously mentioned, the high boiling point of these curing agents permits curing the resins at higher temperatures without loss of the curing agent, and the high molecular weight of these compounds accounts for the enhancement of the pot life of the catalyzed mixture.

While the foregoing examples have been concerned primarily with the curing of a diglycidyl ether of bisphenol A (Epon 828), these dipyridyl (and their analogs) curing agents are useful in the curing of the epoxy resin monomers in general, especially those of the type described above. While diallyl tetrahydrodipyridyl has been disclosed as a preferred curing agent, it should be understood that the other curing agents which are analogous thereto are similarly useful in curing epoxy resins and producing cured resin products which have superior hardness and impact strength. Examples of other curing agents of the general class described, which can be used in the curing of epoxy resin monomers, are set forth as follows:

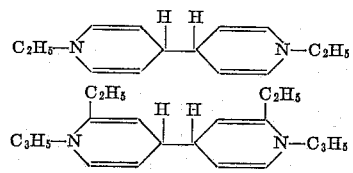

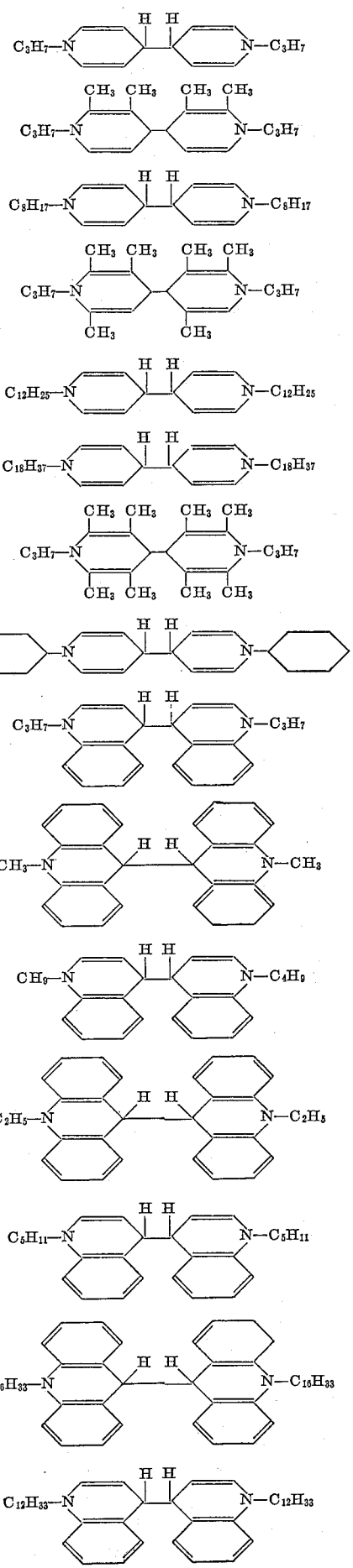

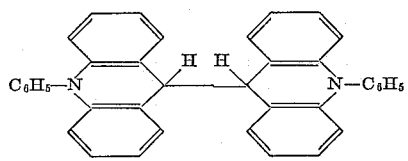

While I have described my invention fully and completely with special emphasis upon several preferred embodiments, I wish it to be understood that within the scope of the appended claims, this invention can be practiced otherwise, than as specifically described herein.

The embodiments of the invention in which an exclusive property or privilege is claimed are defined as follows:

1. In the curing of 1,2-diepoxy monomers with amines, the improvement which comprises curing said monomers with a small amount, effective to promote the hardening of said monomers, of an amine curing agent, said amine being selected from the group consisting of:

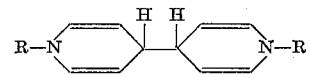

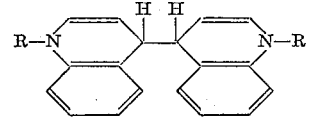

and

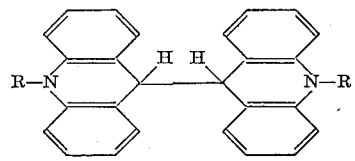

and $C_1$ to $C_4$ alkyl-substituted derivatives thereof, wherein R is selected from the group consisting of unsubstituted alkyl, alkenyl, and aryl radicals having 1 to 18 carbon atoms.

2. A method in accordance with claim 1 in which the curing agent has the formula

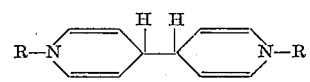

wherein R is selected from the group consisting of unsubstituted alkyl, alkenyl and aryl radicals having from 1 to 18 carbon atoms.

3. A method in accordance with claim 2 wherein R is alkyl.

4. A method in accordance with claim 2 wherein R is alkenyl.

5. A method in accordance with claim 2 wherein R is aryl.

6. A method in accordance with claim 2 wherein R is allyl.

7. A method in accordance with claim 1 in which the curing agent has the formula

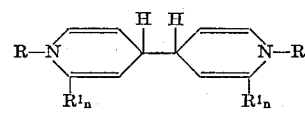

wherein R is selected from the group consisting of an unsubstituted alkyl, alkenyl and aryl radical having 1 to 18 carbon atoms, $R^1$ is an unsubstituted alkyl radical and $n$ is an integer of from 1 to 4.

8. A curable composition consisting essentially of a 1,2-diepoxy resin monomer containing 5–20% by weight of a curing agent selected from the group consisting of

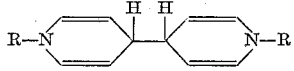

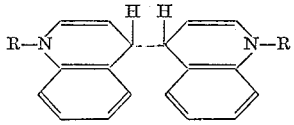

and

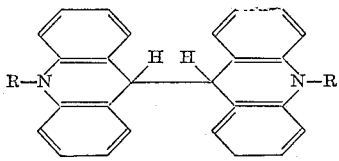

and C$_1$ to C$_4$ alkyl-substituted derivatives thereof, wherein R is selected from the group consisting of unsubstituted alkyl, alkenyl, and aryl radicals having 1 to 18 carbon atoms.

9. Thermosetting intermediate reaction products obtained by partial curing of the composition of claim 8.

10. The polymerized cured product obtained by heating the composition of claim 8.

11. A curable composition in accordance with claim 8 in which the curing agent is

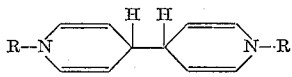

wherein R is selected from the group consisting of unsubstituted alkyl, alkenyl and aryl radicals having from 1 to 18 carbon atoms.

12. A curable composition in accordance with claim 8 in which the curing agent is

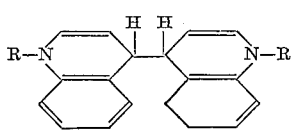

wherein R is selected from the group consisting of unsubstituted alkyl, alkenyl and aryl radicals having from 1 to 18 carbon atoms.

13. A curable composition in accordance with claim 8 in which the curing agent is

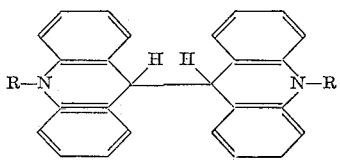

wherein R is selected from the group consisting of unsubstituted alkyl, alkenyl and aryl radicals having from 1 to 18 carbon atoms.

14. A curable composition in accordance with claim 8 in which the curing agent is

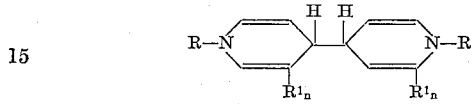

wherein R is selected from the group consisting of unsubstituted alkyl, alkenyl and aryl radicals having from 1 to 18 carbon atoms, R$^1$ is an unsubstituted alkyl radical and $n$ is an integer of from 1 to 4.

15. A curable composition in accordance with claim 8 in which the curing agent is diallyl tetrahydrodipyridyl.

16. A curable composition in accordance with claim 8 in which the 1,2-diepoxy resin monomer is selected from the group consisting of diglycidyl ethers and diglycidyl esters selected from the group consisting of diglycidyl ester of diphenolic acid, diglycidyl esters of phthalic acids, diglycidyl esters of aliphatic dibasic acids and diglycidyl esters of 4,4'-tetrahydrodipyridyl dicarbamic acid.

17. A curable composition in accordance with claim 16 in which the 1,2-diepoxy resin monomer is a diglycidyl ether of bis-(4-hydroxyphenyl)-2,2 propane.

18. A curable composition consisting essentially of a diglycidyl ether of bis-(4-hydroxyphenyl)-2,2 propane containing 5–20% by weight of diallyl tetrahydrodipyridyl.

References Cited by the Examiner

UNITED STATES PATENTS 2,136,928 11/1938 Schlack _____ 260—47
2,444,333 6/1948 Castan _____ 260—47
2,599,974 1/1952 Carpenter et al. _____ 260—47

OTHER REFERENCES

Emmert et al.: Ber., 54, 204–9 (1921).

WILLIAM H. SHORT, *Primary Examiner.*

JOSEPH R. LIBERMAN, *Examiners.*

T. D. KERWIN, *Assistant Examiner.*